US009514718B2

(12) United States Patent
Itoh et al.

(10) Patent No.: US 9,514,718 B2
(45) Date of Patent: Dec. 6, 2016

(54) INFORMATION PROCESSING SYSTEM, INFORMATION PROCESSING APPARATUS, AND INFORMATION PROCESSING METHOD

(71) Applicants: Atsushi Itoh, Kanagawa (JP); Jun Murata, Tokyo (JP); Nobuyuki Kishi, Tokyo (JP); Tetsuya Sakayori, Tokyo (JP); Takayuki Kunieda, Tokyo (JP); Takanobu Tanaka, Kanagawa (JP); Hiroshi Yamaguchi, Kanagawa (JP)

(72) Inventors: Atsushi Itoh, Kanagawa (JP); Jun Murata, Tokyo (JP); Nobuyuki Kishi, Tokyo (JP); Tetsuya Sakayori, Tokyo (JP); Takayuki Kunieda, Tokyo (JP); Takanobu Tanaka, Kanagawa (JP); Hiroshi Yamaguchi, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 259 days.

(21) Appl. No.: 14/193,922

(22) Filed: Feb. 28, 2014

(65) Prior Publication Data
US 2014/0267423 A1 Sep. 18, 2014

(30) Foreign Application Priority Data

Mar. 15, 2013 (JP) .................................. 2013-054416

(51) Int. Cl.
| | | |
|---|---|---|
| G06T 13/40 | (2011.01) | |
| G09G 5/12 | (2006.01) | |
| G09G 5/377 | (2006.01) | |
| G06Q 10/00 | (2012.01) | |
| H04L 29/00 | (2006.01) | |
| H04L 29/08 | (2006.01) | |

(52) U.S. Cl.
CPC .............. *G09G 5/377* (2013.01); *G06Q 10/00* (2013.01); *H04L 29/00* (2013.01); *H04L 67/20* (2013.01); *G09G 5/12* (2013.01)

(58) Field of Classification Search
None
See application file for complete search history.

(56) References Cited

U.S. PATENT DOCUMENTS

| | | |
|---|---|---|
| 2008/0242429 A1 | 10/2008 | Itoh et al. |
| 2009/0005162 A1 | 1/2009 | Itoh |
| 2009/0262116 A1* | 10/2009 | Zhao et al. .................... 345/473 |
| 2011/0283323 A1* | 11/2011 | Ramsdell ......................... 725/50 |
| 2012/0244891 A1* | 9/2012 | Appleton ........................ 455/466 |
| 2013/0335442 A1* | 12/2013 | Fleck et al. .................... 345/629 |
| 2013/0347019 A1* | 12/2013 | Herlein et al. ................... 725/22 |

FOREIGN PATENT DOCUMENTS

| | | |
|---|---|---|
| JP | 2002-208015 | 7/2002 |
| JP | 2009-000174 | 1/2009 |
| JP | 2009-101122 | 5/2009 |
| JP | 2013-254314 | 12/2013 |
| JP | 2014-149633 A | 8/2014 |

* cited by examiner

*Primary Examiner* — Kee M Tung
*Assistant Examiner* — Yi Wang
(74) *Attorney, Agent, or Firm* — Harness, Dickey & Pierce, PLC

(57) ABSTRACT

An information processing system includes: a terminal device; and an information processing apparatus. The information processing apparatus includes: a holding unit that holds a plurality of pieces of workflow information each including information that specifies a process constituting a service; a receiving unit that receives service identification information, device identification information, and an image transmitted from a terminal device; a selecting unit that selects a piece of the workflow information corresponding to the service identification information and the device identification information from the pieces of the workflow information; and an executing unit that executes a service in which the image is processed into an image including a movie in accordance with the workflow information selected by the selecting unit.

18 Claims, 10 Drawing Sheets

FIG.3

| DEVICE ID | CONTENT ID |
|---|---|
| 001 | C01 |
| 002 | C02 |
| 003 | C03 |

FIG.4

| SERVICE ID | DEVICE ID | WF |
|---|---|---|
| AAA | 001 | A01 |
| | 002 | A02 |
| | 003 | |
| | 004 | A03 |
| BBB | 005 | B01 |
| | 002 | |

FIG.8

| CONSTITUENT DATA | EXAMPLE CONTENT |
|---|---|
| Input | DEVICE ID |
| Output | DEVICE ID |
| PROCESS PARAMETER | MOVIE/CUTOFF ANIMATION/... |
| Inputdata | USER INPUT DATA |
| Contents | BACKGROUND IMAGE DATA |

INFORMATION PROCESSING SYSTEM, INFORMATION PROCESSING APPARATUS, AND INFORMATION PROCESSING METHOD

CROSS-REFERENCE TO RELATED APPLICATIONS

The present application claims priority to and incorporates by reference the entire contents of Japanese Patent Application No. 2013-054416 filed in Japan on Mar. 15, 2013.

BACKGROUND OF THE INVENTION

1. Field of the Invention

The present invention relates to an information processing system, an information processing apparatus, and an information processing method that process information concerning a plurality of services.

2. Description of the Related Art

In recent years, owing to the spread of communication networks, a variety of services have been provided via the networks. Japanese Patent Application Laid-open No. 2009-000174 discloses a fighting game in which a match is played via a network using a character drawn by each of the players.

Furthermore, the number of systems that provide services using a network cloud have been increasing in recent years. A network cloud includes a plurality of computers connected with one another via a network, and is a network group that indicates only the input and output thereof and appears as a black box the inside of which is hidden from the outside. For example, when a plurality of services are provided by a network cloud, the user can select and use a desired service from the services without being aware of the whereabouts of the services.

Conventionally, dedicated applications have been prepared for the respective services provided by the network cloud. Consequently, the user needs to install a plurality of applications corresponding to the respective services on a terminal device one by one, and thus it is troublesome.

Furthermore, it is possible to prepare a single application for selecting and using one service out of the services. Even in this case, however, the user still needs the operation to select a desired service from the services, and thus it is still troublesome and may lead to an erroneous operation.

In view of the situation above, there is a need to make a plurality of services provided via a network available easily.

SUMMARY OF THE INVENTION

It is an object of the present invention to at least partially solve the problems in the conventional technology.

An information processing system includes: a terminal device; and an information processing apparatus. The terminal device includes: a first acquiring unit that acquires service identification information that identifies a service; a second acquiring unit that acquires device identification information that identifies a device; an image acquiring unit that acquires an image; and a transmitting unit that transmits the service identification information, the device identification information, and the image. The information processing apparatus includes: a holding unit that holds a plurality of pieces of workflow information, each piece of the workflow information including information that specifies a process constituting a service; a receiving unit that receives the service identification information, the device identification information, and the image transmitted from the terminal device; a selecting unit that selects a piece of the workflow information corresponding to the service identification information and the device identification information from the pieces of the workflow information; and an executing unit that executes a service in which the image is processed into an image including a movie in accordance with the workflow information selected by the selecting unit.

An information processing apparatus includes: a holding unit that holds a plurality of pieces of workflow information, each piece of the workflow information including information that specifies a process constituting a service; an acquiring unit that acquires service identification information that identifies the service, device identification information that identifies a device, and an image; a selecting unit that selects a piece of the workflow information corresponding to the service identification information and the device identification information from the pieces of the workflow information; and an executing unit that executes a service in which the image is processed into an image including a movie and is output in accordance with the workflow information selected by the selecting unit.

An information processing method includes: acquiring service identification information that identifies a service, device identification information that identifies a device, and an image; selecting a piece of workflow information including information that specifies a process constituting a service out of a plurality of pieces of the workflow information in accordance with the service identification information and the device identification information; and executing a service in which the image is processed into an image including a movie and is output in accordance with the workflow information selected at the selecting.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a table illustrating an example of a content table that associates content data with signage devices in the embodiment;

FIG. 4 is a table illustrating an example of a workflow specifying table in the embodiment;

FIG. 8 is a table illustrating an example of a configuration of workflow information in the embodiment;

DETAILED DESCRIPTION OF THE PREFERRED EMBODIMENTS

With reference to the accompanying drawings, embodiments of an information processing system, an information processing apparatus, and an information processing method will be described in detail hereinafter.

Figure 1:
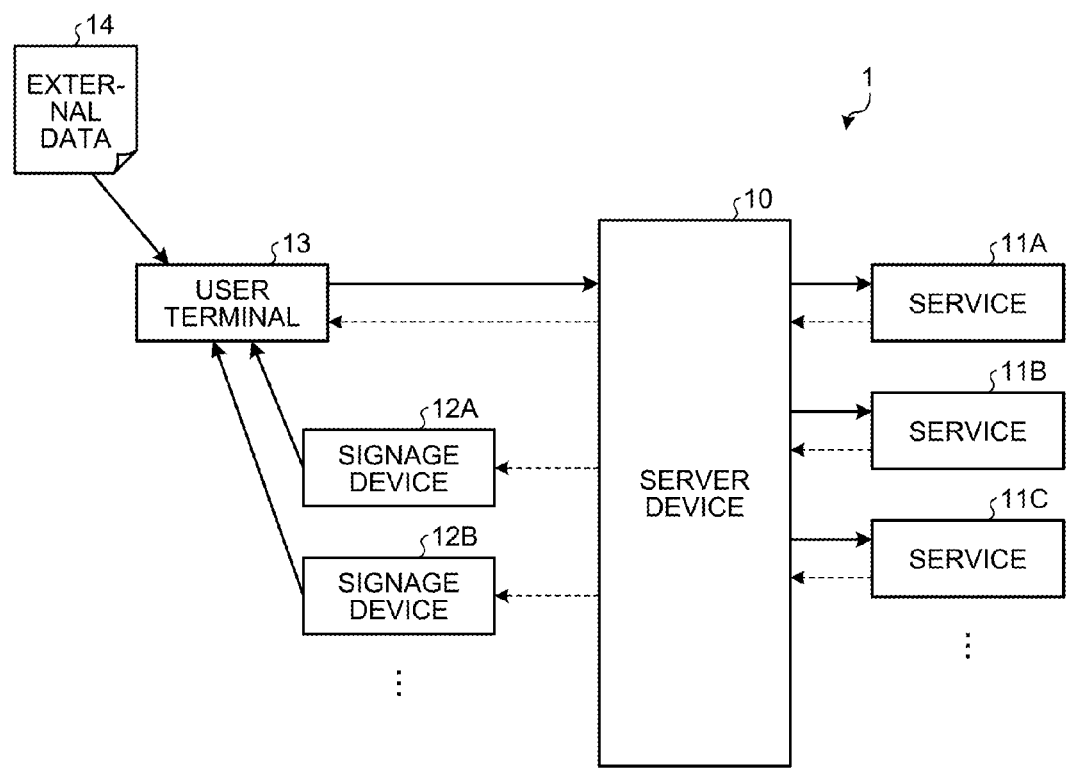
FIG. 1 is a block diagram for explaining a general outline of an information processing system according to an embodiment of the present invention.

With reference to FIG. 1, a general outline of an information processing system 1 according to an embodiment will be described. The information processing system 1 includes a server device 10 as an information processing apparatus that executes a plurality of services 11A, 11B, 11C, and so forth. The server device 10 may be configured with a single computer or may be dispersedly configured with a plurality of computers connected with one another. Furthermore, the server device 10 may be configured on a network cloud.

A user terminal 13 is an information processing apparatus, for example, a multifunctional cell phone, a multifunctional personal handy-phone system (PHS), and a tablet personal computer, which is portable and capable of performing communication via a network such as the Internet using radio communication. The user terminal 13 preferably has a near-field communication function in addition. In the following description, the user terminal 13 is exemplified to have the near-field communication function. Furthermore, the user terminal 13 preferably has a photographing function of photographing at least a still image. On the user terminal 13, an application concerning the information processing system in the embodiment is installed. When the information processing system 1 in the embodiment is used, this application is started up.

Signage devices 12A, 12B, and so forth are advertising media referred to as an electronic signboard that displays video and information by digital data and has a communication function, and are installed at sites that are easily visible to general users such as stores, public facilities, and sightseeing areas. In the embodiment, the signage devices 12A, 12B, and so forth further support near field communication. Each of the signage devices 12A, 12B, and so forth, for example, displays the information corresponding to the respective services 11A, 11B, and so forth, and by the near field communication, transmits service identification information (hereinafter, referred to as a service ID) that identifies the service of the information displayed, and device identification information (hereinafter, referred to as a device ID) that identifies each of the signage devices 12A, 12B, and so forth.

It is assumed that the server device 10 and the signage devices 12A, 12B, and so forth are connected with one another via a network such as the Internet, and the server device 10 holds the network address of each of the signage devices 12A, 12B, and so forth associated with the device ID thereof.

In such a configuration, the process performed when the user requests the service 11A will be explained roughly. In this case, the user brings the user terminal 13 close to, for example, the signage device 12A that displays the information of the service 11A that the user wants to receive. Consequently, the communication via near field communication is performed between the signage device 12A and the user terminal 13, and the signage device 12A transmits the device ID that identifies the signage device 12A and the service ID that identifies the service 11A, which is presented by the signage device 12A, to the user terminal 13.

The user terminal 13 transmits the device ID and the service ID to the server device 10, for example, in response to the operation of the user. The server device 10 receives the device ID and the service ID transmitted from the user terminal 13. The server device 10 selects a workflow (WF) to execute the service 11A based on the device ID and the service ID received and acquired from the user terminal 13. The workflow here is a combination of processes to execute a service. For a single service, a plurality of workflows can be defined.

The server device 10 executes the service 11A in accordance with the workflow selected, and transmits the result to, for example, the user terminal 13. The user terminal 13, in accordance with the content of the service 11A, performs display according to the received execution result of the service 11A, storing of data received as the execution result, and/or another process. It is not restricted thereto, and may transmit the execution result of the service 11A to the signage device 12A.

Furthermore, the user terminal 13 may acquire external data 14 in which a service ID is included in advance and transmit the data to the server device 10. As one example, when the user terminal 13 has a photographing function, the user terminal 13 photographs a form on which a service ID along with an image and/or the like are printed using the photographing function, and transmits the photographed image data to the server device 10 as the external data 14. The user terminal 13 further transmits a terminal ID that identifies itself as a device ID to the server device 10 together with the external data 14. The server device 10 performs an image analysis on the transmitted external data 14 and extracts the service ID. The server device 10 then specifies a workflow based on the extracted service ID and the transmitted device ID, and executes the service in accordance with the specified workflow. The execution result is transmitted to the user terminal 13, the signage devices 12A, 12B, and/or the like.

In this way, in accordance with the embodiment, a desired service can be received even when the operation to select the service is not performed on the user terminal 13.

Figure 2:
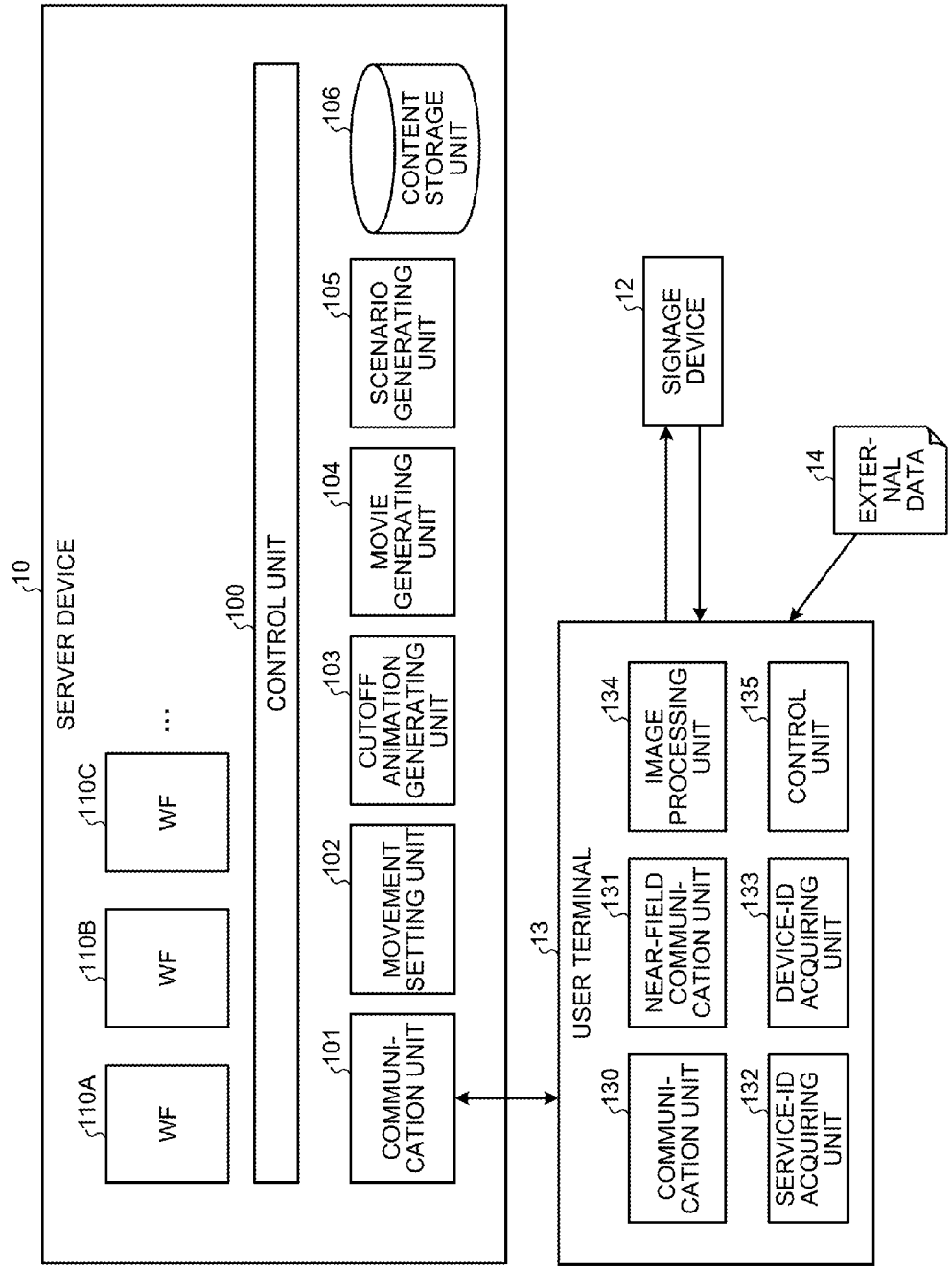
FIG. 2 is a functional block diagram for explaining the functions of a server device and a user terminal in the embodiment.

FIG. 2 is a functional block diagram for explaining the functions of the server device 10 and the user terminal 13 in the embodiment. In the following description, the information processing system 1 generates a movie from an image as one of the provided services. The information processing system 1 can further create a flip book (hereinafter, referred to as cutoff animation) based on the generated movie. The cutoff animation is created, for example, by taking out the images (frames) from all frames of the movie at a given interval and by printing out the taken-out images. The animation is reproduced, for example, by stacking the printed images in reverse order of the chronological order of the frames in an overlapping manner and sequentially turning them over from the bottom.

The signage devices 12A, 12B, and so forth illustrated in FIG. 1 are represented as a signage device 12 in FIG. 2. In the following description, unless otherwise noted specifically, each of the signage devices 12A, 12B, and so forth are described as the signage device 12.

The server device 10 will be described first. The server device 10 includes a control unit 100, a communication unit 101, a movement setting unit 102, a cutoff animation generating unit 103, an movie generating unit 104, a scenario generating unit 105, and a content storage unit 106. The control unit 100, the communication unit 101, the movement setting unit 102, the cutoff animation generating unit 103, the movie generating unit 104, and the scenario generating unit 105 may be configured as various units of a computer program executed on a CPU, or may be configured with pieces of hardware independent of one another to operate cooperatively. Furthermore, the foregoing may be configured with the mixture of hardware and software by a computer program to cooperate with each other.

The server device 10 further includes workflow information (WF) 110A, 110C, and so forth indicative of workflows to execute services. A single service can include a plurality of workflows. In the following description, unless otherwise noted specifically, a plurality of pieces of workflow information 110A, 110B, 110C, and so forth are represented by workflow information 110. The workflow information 110 is the information that specifies a combination of processes constituting a service.

In the server device 10, the communication unit 101, in accordance with the control of the control unit 100, performs communication via a network such as the Internet.

The scenario generating unit 105, in accordance with the workflow information 110, generates a scenario that defines the display order and timing of images, background images, and/or the like for movie (animation) display. For example, the scenario generating unit 105 generates a scenario to change the images for animation display along the time axis according to a given story. The movie generating unit 104 generates a movie according to the scenario defined by the scenario generating unit 105. The cutoff animation generating unit 103 generates a cutoff animation from the movie generated by the movie generating unit 104 according to the scenario defined by the scenario generating unit 105. It is not restricted thereto, and may generate the cutoff animation directly from the original source image.

The movement setting unit 102 sets up how the data generated in accordance with the workflow information 110 behaves in the user terminal 13 when the data is transmitted to the user terminal 13.

The content storage unit 106 stores therein content data of the content presented in accordance with the workflow information 110 in advance. The content storage unit 106 can store therein the content data transmitted from the user terminal 13. The content includes image data. The image data included in the content is the image data of background images and character images, for example. It is not restricted thereto, and the content storage unit 106 can include the story used when the scenario generating unit 105 generates the scenario as in the foregoing as the content. Furthermore, the content storage unit 106 may store therein audio data as the content data. Each piece of the content stored in the content storage unit 106 is identified by a content ID.

The background image is an image for which the whole area of the image provided in a rectangular shape is the target of handling. The character image is an image for which a part of the image provided in a rectangular shape is the target of handling.

Each piece of the content is associated with, for example, each of the signage devices 12A, 12B, and so forth. FIG. 3 illustrates an example of a content table that associates the content with the signage devices 12A, 12B, and so forth in the embodiment. In the example in FIG. 3, the device ID is associated with the content ID. A single device ID can be associated with a plurality of content IDs. This enables each piece of the content to be managed according to the installation site and installation purpose of the respective signage devices 12A, 12B, and so forth. Furthermore, a single content ID can be associated with a plurality of device IDs. The scenario generating unit 105 refers to the content table according to, for example, the device ID to select appropriate content.

The control unit 100 controls the movement setting unit 102, the cutoff animation generating unit 103, the movie generating unit 104, and the scenario generating unit 105 in accordance with the workflow information 110. More specifically, the control unit 100 serves as a platform that intervenes between each piece of the workflow information 110A, 110B, 110C, and so forth and the communication unit 101, the movement setting unit 102, the cutoff animation generating unit 103, the movie generating unit 104, and the scenario generating unit 105.

For example, the control unit 100 refers to a workflow specifying table, which will be described later with reference to FIG. 4, to specify the workflow information 110 in accordance with the service ID and the device ID transmitted from the user terminal 13 and received by the communication unit 101. The control unit 100 functions as an executing unit that executes the service in accordance with the specified workflow information 110. For example, the control unit 100 transfers the specified workflow information 110 to the scenario generating unit 105. The control unit 100 further transfers the scenario information generated by the scenario generating unit 105 to the movie generating unit 104 and to the cutoff animation generating unit 103.

FIG. 4 illustrates an example of the workflow specifying table in the embodiment. The workflow specifying table associates the service ID, the device ID, and the workflow information (WF) with one another. In this case, a single service ID can be associated with a plurality of device IDs and a plurality of pieces of workflow information. A single piece of workflow information can be associated with a plurality of device IDs. Furthermore, as long as the service IDs are different, a single device ID can be associated with a plurality of pieces of workflow information.

Figure 5:
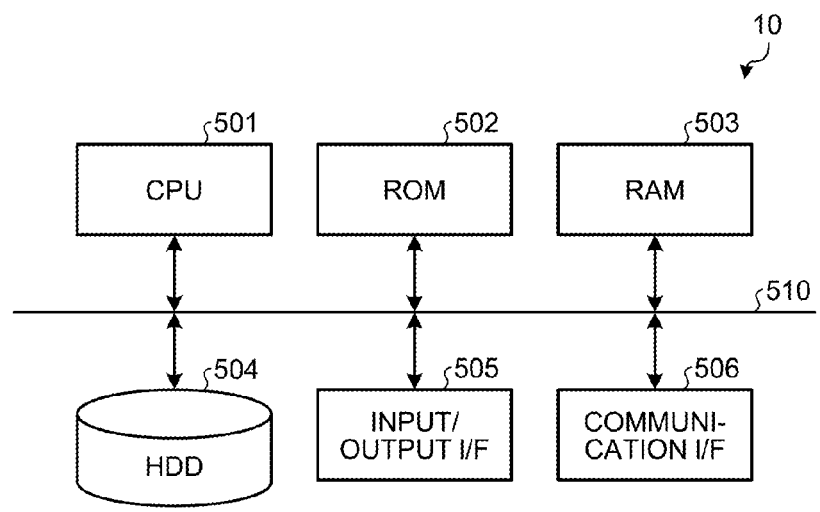
FIG. 5 is a block diagram illustrating an example of a hardware configuration of the server device in the embodiment.

FIG. 5 illustrates an example of a hardware configuration of the server device 10 in the embodiment. As for the server device 10, the configuration of a commonly-used computer can be applied, and thus the server device 10 includes a central processing unit (CPU) 501, a read only memory (ROM) 502, a random access memory (RAM) 503, a hard disk drive (HDD) 504, an input/output interface (I/F) 505, and a communication I/F 506. The CPU 501, the ROM 502, the RAM 503, the HDD 504, the input/output I/F 505, and the communication I/F 506 are connected to perform communication with one another via a bus 510.

The CPU 501 operates in accordance with the programs stored in the ROM 502 and the HDD 504 in advance using the RAM 503 as a work memory, and controls the overall operation of the server device 10. The HDD 504 stores therein the programs for causing the CPU 501 to operate. The HDD 504 further stores therein the content table, the workflow specifying table, and the workflow information 110 which will be described later with reference to FIG. 8, and serves as a holding unit that holds the workflow information. Moreover, the HDD 504 corresponds to the content storage unit 106 illustrated in FIG. 2, and stores therein the content including image data and/or audio data.

The input/output I/F 505 is an interface for input and output of data to and from the server device 10. For example, the input/output I/F 505 can be connected to an input device such as a keyboard which receives user input. Furthermore, the input/output I/F 505 can be connected to a data interface such as universal serial bus (USB), which inputs and outputs data to and from another device, and with a drive device that reads out data from a recording medium such as a compact disc (CD) and a digital versatile disc (DVD). Further, the input/output I/F 505 can be connected to a display device that displays a display control signal generated by the CPU 501 as an image.

The communication I/F 506, in accordance with the control of the CPU 501, performs communication via a network such as the Internet. The communication I/F 506 can perform communication with the user terminal 13 via an access point connected to the Internet by wireless communication.

The control unit 100, the communication unit 101, the movement setting unit 102, the cutoff animation generating unit 103, the movie generating unit 104, and the scenario generating unit 105 in the foregoing are implemented by a computer program that is stored in the HDD 504 in advance and runs on the CPU 501. The program is configured, for example, to be stored in a computer connected to a network not depicted and provided by being downloaded via the network by the communication I/F 506. It is not restricted thereto, and the program may be recorded and provided in a computer-readable recording medium such as a CD and a DVD, as an installable or executable file.

The program is modularly configured to include, for example, the above-described various units (the control unit 100, the communication unit 101, the movement setting unit 102, the cutoff animation generating unit 103, the movie generating unit 104, and the scenario generating unit 105), and as the actual hardware, the CPU 501 reads out the program from a storage device, for example, the HDD 504 and executes it to load the various units on a main memory device (for example, the RAM 503), and thus the various units are generated on the main memory device.

Next, the user terminal 13 will be described. The user terminal 13 includes a communication unit 130, a near-field communication unit 131, a service-ID acquiring unit 132, a device-ID acquiring unit 133, an image processing unit 134, and a control unit 135. The communication unit 130 controls communication via a network such as the Internet. The near-field communication unit 131 controls near field communication. The service-ID acquiring unit 132 and the device-ID acquiring unit 133 extract a service ID and a device ID, respectively, from the information transmitted from, for example, the signage device 12 via near field communication.

Furthermore, when the external data 14 is used, the service-ID acquiring unit 132 extracts a service ID from the external data 14. For example, when the external data 14 is the image data in which an image including the description of a service ID is photographed, the service-ID acquiring unit 132 analyzes the image data and extracts the service ID from the image. The extraction of the service ID from the image data may be performed by the control unit 100 of the server device 10 which will be described later. The device-ID acquiring unit 133, for example, acquires the terminal ID of the user terminal 13 itself stored in advance in a ROM 403, which will be described later with reference to FIG. 6, as a device ID.

The service ID and the device ID acquired by the service-ID acquiring unit 132 and the device-ID acquiring unit 133, respectively, are transmitted to the server device 10 by the communication unit 130.

The image processing unit 134 includes an image generation and processing function, an image recognition function concerning the above-described image analysis, and an animation generation function. The animation generation function includes the various functions of the cutoff animation generating unit 103, the movie generating unit 104, and the scenario generating unit 105 in the server device 10.

The control unit 135, in accordance with the program, controls the operation of the communication unit 130, the near-field communication unit 131, the service-ID acquiring unit 132, and the device-ID acquiring unit 133 of the user terminal 13.

Figure 6:
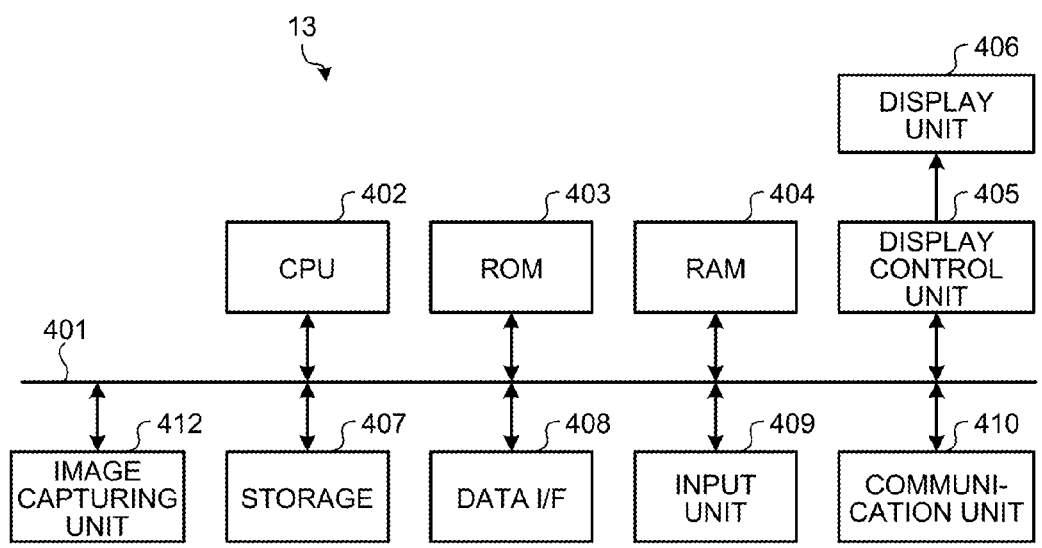
FIG. 6 is a block diagram illustrating an example of a hardware configuration of the user terminal in the embodiment.

FIG. 6 illustrates an example of a hardware configuration of the user terminal 13 in the embodiment. In the user terminal 13 illustrated in FIG. 6, a CPU 402, the ROM 403, a RAM 404, and a display control unit 405 are connected to a bus 401. Furthermore, a storage 407, a data I/F 408, an input unit 409, a communication unit 410, and an image capturing unit 412 are connected to the bus 401. The storage 407 is a storage medium that can store therein data in a nonvolatile manner, and is, for example, a nonvolatile semiconductor memory such as a flash memory. It is not restricted thereto, and a hard disk drive may be used as the storage 407.

The CPU 402 controls the overall user terminal 13 in accordance with the program stored in the ROM 403 and the storage 407 using the RAM 404 as a work memory. The display control unit 405 outputs a display control signal generated by the CPU 402 by converting it to a signal displayable on a display unit 406. The ROM 403 or the storage 407 stores therein in advance a unique terminal identifier (terminal ID) to identify the user terminal 13.

The storage 407 stores therein programs to be executed by the CPU 402 and various data. The storage 407 and the ROM 403 can share a single rewritable nonvolatile semiconductor memory, for example. The data I/F 408 inputs and outputs data to and from an external device. As for the data I/F 408, an interface such as USB and Bluetooth (registered trademark) can be applied.

The input unit 409 includes an input device that receives user input. The user can give instructions to the user terminal 13 by operating the input device in response to the display on the display unit 406. The input device that receives the user input is preferably configured with the display unit 406 in an integrated manner and configured as a touch panel that outputs a control signal in response to the pressed position thereon and transmits the image on the display unit 406.

The communication unit 410 includes a communication I/F that performs communication via a network such as the Internet in accordance with the control of the CPU 402. The communication unit 410 further includes a communication I/F to perform near field communication. When the communication unit 410 detects a signal via the near field communication, for example, the communication unit 410 notifies the CPU 402 thereof. When the CPU 402 receives the notice, the CPU 402 controls the communication unit 410 to perform an authentication process and/or the like for the near field communication, and when the authentication is successful, to perform receiving of a service ID and a device ID, transmitting of images, and/or the like via the near field communication.

The image capturing unit 412 includes an optical system, an image capturing element, and a control drive circuit for the optical system and the image capturing element, and performs a given process on a signal output from the image capturing element to output as image data. The image capturing unit 412 performs functions such as image capturing, zooming, and others according to the instructions given by the user operation performed on the input unit 409. The image captured and acquired by the image capturing unit 412 is sent to the communication unit 410 via the bus 401, and is transmitted to a server 11 via a network 10 in accordance with the commands of the CPU 402, for example.

The communication unit 130, the near-field communication unit 131, the service-ID acquiring unit 132, the device-ID acquiring unit 133, the image processing unit 134, and the control unit 135 in the foregoing are implemented by a computer program that is stored in the ROM 403 or the storage 407 in advance and runs on the CPU 402. The program is configured, for example, to be stored in a computer connected to a network not depicted and provided by being downloaded via the network by the communication unit 410. It is not restricted thereto, and the program may be recorded and provided in a computer-readable recording medium such as a CD and a DVD, as an installable or executable file.

The program is modularly configured to include, for example, the various units in the foregoing (the communication unit 130, the near-field communication unit 131, the service-ID acquiring unit 132, the device-ID acquiring unit 133, the image processing unit 134, and the control unit 135), and as the actual hardware, the CPU 402 reads out the program from a storage device such as the ROM 403 and the storage 407 and executes it to load the various units on a main memory device (for example, the RAM 404), and thus the various units are generated on the main memory device.

Figure 7A:
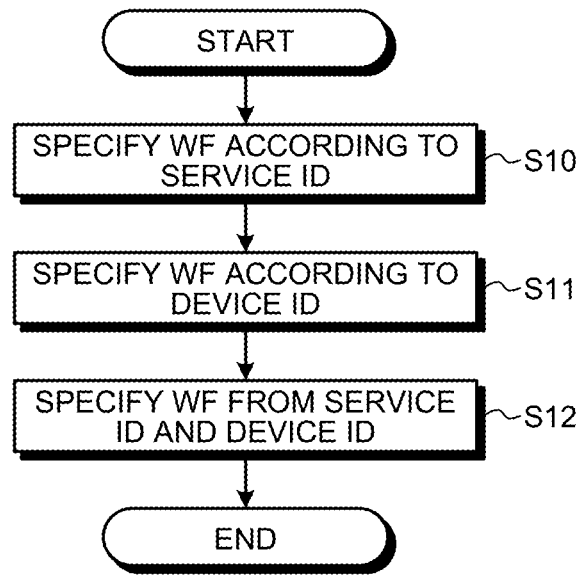
FIG. 7A is a flowchart illustrating an example of a process of referring to the workflow specifying table performed by a control unit in the embodiment.
Figure 7B:
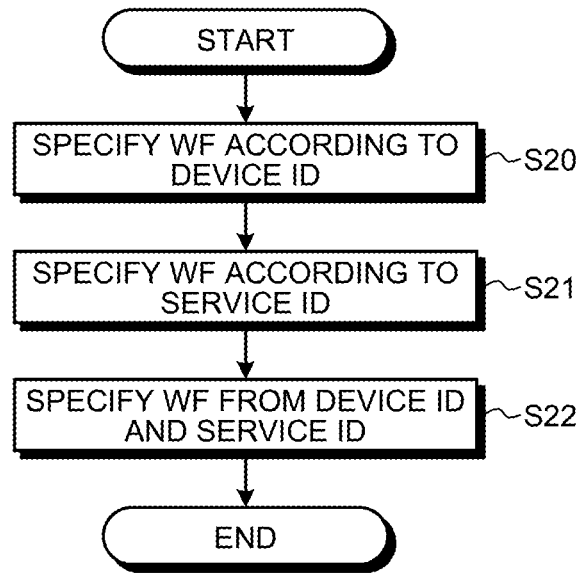
FIG. 7B is a flowchart illustrating an example of the process of referring to the workflow specifying table performed by the control unit in the embodiment.

FIGS. 7A and 7B illustrate examples of a process of referring to the workflow specifying table performed by the control unit 100 in the embodiment. FIG. 7A is an example of the process according to the embodiment in which workflow information is specified with a service ID as a main constituent. In this case, the control unit 100 first specifies the workflow information according to a service ID (Step S10). With the example in FIG. 4, when the service ID transferred from the communication unit 101 is AAA, the workflow information is specified to be any one of A01, A02, and A03. The control unit 100 then specifies the workflow information according to a device ID (Step S11). With the example in FIG. 4, when the device ID transferred from the communication unit 101 is 002, the workflow information A02 is specified out of the workflow information A01, A02, and A03. In this way, the workflow information A02 is specified from the service ID and the device ID (Step S12).

FIG. 7B is an example of the process according to the embodiment in which the workflow information is specified with a device ID as a main constituent. In this case, the control unit 100 first specifies the workflow information according to a service ID (Step S20). With the example in FIG. 4, when the device ID transferred from the communication unit 101 is 002, the workflow information is specified to be either one of A02 and B01. The control unit 100 then specifies the workflow information according to a service ID (Step S21). With the example in FIG. 4, when the service ID transferred from the communication unit 101 is AAA, the workflow information A02 is specified out of the workflow information A02 and B01. In this way, the workflow information A02 is specified from the device ID and the service ID (Step S22).

FIG. 8 illustrates an example of a configuration of the workflow information 110 in the embodiment. In the example in FIG. 8, the workflow information includes parameters of Input, Output, Inputdata, and Contents, and a process parameter.

The parameter Input represents the category of device that receives data for a service (for example, the user terminal 13). The parameter Output represents the category of device to which the output by the service is provided (for example, the signage device 12). At this time, for the parameter Output, the location at which the signage device 12 is installed and the purpose of use of the signage device 12 (for example, the signage device 12 installed in the XX museum) may further be added.

The process parameter represents the process executed by the service. For example, described as the process parameter are the items of Movie, Cutoff animation, Only image display for the signage device 12, and Image combination of combining an image from a user terminal with a background image.

The parameter Inputdata represents the category of data received from the user terminal 13 for the service (coloring image data, character image data, and others). No-input data can be specified. The parameter Contents represents the category of content provided as content data from the information processing system 1 (a background image, a scenic spot image, an image corresponding to the device ID, sound, or the like).

In the server device 10, the control unit 100 specifies the workflow information 110 from the service ID and the device ID transmitted from the user terminal 13. The control unit 100 then controls the movement setting unit 102, the cutoff animation generating unit 103, the movie generating unit 104, and the scenario generating unit 105 based on the parameters of Input, Output, Inputdata, Contents and the process parameter included in the specified workflow information 110. Along with that, the control unit 100 reads out the content from the content storage unit 106, and executes the service corresponding to the workflow information 110 out of the services 11A, 11B, 11C, and so forth.

The server device 10, as the hardware configuration, can be implemented with the same configuration as a commonly-used computer, and thus includes, for example, a central processing unit (CPU); a storage device such as a read only memory (ROM), a random access memory (RAM), and a hard disk drive; a drive device that supports a compact disc (CD) and a digital versatile disc (DVD); a display device; an input device; and a communication interface. The storage device stores therein programs that make the computer operate as the server device 10; the content 106; and a variety of information such as the respective pieces of workflow information 110A, 110B, 110C, and so forth.

The whole or a part of the functions of the control unit 100, the communication unit 101, the movement setting unit 102, the cutoff animation generating unit 103, the movie generating unit 104, and the scenario generating unit 105 in the server device 10 is implemented by a computer program that runs on the CPU. The program is configured, for example, to be stored in a computer connected to a network not depicted and provided by being downloaded via the network by the communication interface. It is not restricted thereto, and the program may be recorded and provided in a computer-readable recording medium such as a CD and a DVD, as an installable or executable file.

The program is modularly configured to include, for example, the above-described various units (the control unit 100, the communication unit 101, the movement setting unit 102, the cutoff animation generating unit 103, the movie generating unit 104, and the scenario generating unit 105), and as the actual hardware, the CPU reads out the program from the storage device and executes it to load the various units on a main memory device (for example, the RAM), and thus the various units are generated on the main memory device.

First Service Example

Figure 9:
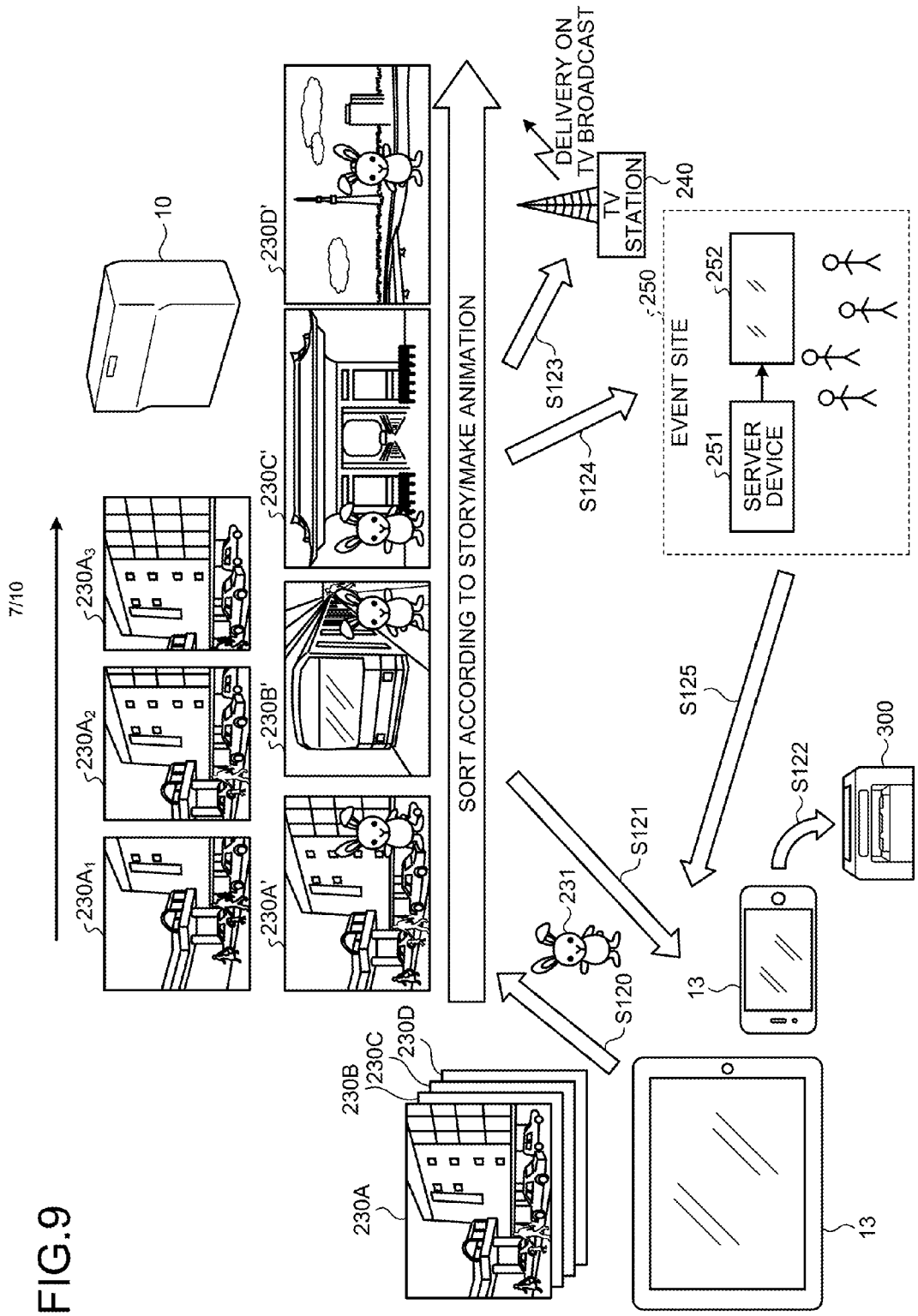
FIG. 9 is a diagram for explaining a first service example provided by the information processing system in the embodiment.

Next, examples of services provided by the information processing system 1 in the embodiment will be described. With reference to FIG. 9, an example of a first service provided by the information processing system 1 in the embodiment is described first. The first service example is an example in which the server device 10 processes background images and character images transmitted from the user terminal 13 into respective movies, and then combines the animated background images and the animated character images to output. At this time, the server device 10 generates a movie that displays, for example, a plurality of background images switching in sequence according to a given scenario.

In the following description, the first service is assumed to be applied to a project in which an animated image, which is obtained by animate and combine background images and character images created by the user in accordance with a given format, is broadcasted by a television broadcast station and delivered to the general public. The user acquires coloring format images to create background images and character images, for example, from the producer of the project. A plurality of coloring format images are prepared for background images and character images, and thus the user can perform coloring by selecting the background images and the character images of his/her choice.

In the coloring format image, a service ID is printed in advance. In addition, image identification information to identify each of the background images and the character images may be printed. The service ID and the image identification information may be printed using a bar code or a QR code (registered trademark), or may be a string of characters or an image. The background images are associated with a given story in advance. The story is stored in the content storage unit 106.

The user performs coloring on the acquired coloring format images, and creates background images 230A, 230B, 230C, and 230D, and a character image 231. The coloring may be performed using a function of the image processing unit 134 of the user terminal 13 and an image processing application installed on the user terminal 13, or the coloring format images may be printed once and then the coloring may be performed on the printed images. The background images 230A, 230B, 230C, and 230D and the character image 231 are photographed to include the service ID thereof by the user terminal 13, and are acquired as coloring images.

The user uses the user terminal 13 to perform communication with the information processing system 1, and transmits the coloring images and the terminal ID of the user terminal 13 itself to the information processing system 1 (Step S120).

In the information processing system 1, the server device 10 performs an image analysis on the coloring images received from the user terminal 13 to extract the service ID. The server device 10 uses the terminal ID received from the user terminal 13 as a device ID, and specifies the workflow information 110 based on the service ID and the device ID. In the workflow information 110 corresponding to the second service, for example, the parameter Input is set to the user terminal 13 and the parameter Output is set to movie output. Furthermore, the parameter Inputdata is set to coloring images of background and character, and the parameter Contents is set to scenario. The process parameter is set to movie generation and combination.

The server device 10, in accordance with the specified workflow information 110, registers the coloring images transmitted and reads out a story from the content storage unit 106. The server device 10 sequences the background images 230A, 230B, 230C, and 230D included in the coloring images according to the story with which the background images 230A, 230B, 230C, and 230D are associated to generate a movie. In this case, movie processing is performed by specifying animation movements to the background images 230A, 230B, 230C, and 230D according to the story. At this time, the movie processing can use a slide-show format in which the background images 230A, 230B, 230C, and 230D are switched in sequence at a given time. Furthermore, when the background images 230A, 230B, 230C, and 230D are switched, a switching effect such as wipe and cube may be inserted.

The animation movement can be specified individually to each of the background images 230A, 230B, 230C, and 230D. For example, as illustrated as background images $230A_1$, $230A_2$, and $230A_3$ with an example of the background image 230A in FIG. 9, by defining an image size smaller than each of the background images 230A, 230B, 230C, and 230D as a display frame, each of the background images 230A, 230B, 230C, and 230D can be caused to move within the display frame. Furthermore, it can be conceived to perform effect processing such as a zooming process on each of the background images 230A, 230B, 230C, and 230D.

The server device 10 further combines the character image 231 included in the coloring images with each of the background images 230A, 230B, 230C, and 230D. At this time, movie processing can be performed on the character image 231 by specifying animation movements according to the story. As the animation movement, for example, moving of the character image 231 within the display frame (within the range of each of the background images 230A, 230B, 230C, and 230D), and reversal, rotation, deformation, and/or the like of the character image 231 can be conceived.

The server device 10 combines each of the background images 230A, 230B, 230C, and 230D with the character image 231, each of which is animation-processed, to generate animated images 230A', 230B', 230C', and 230D'. By combining the character image 231 and the background images 230A, 230B, 230C, and 230D while synchronizing the frame timing therebetween, the animated image in which the character image 231 and the background images 230A, 230B, 230C, and 230D perform the respective animation movements can be obtained.

The user can acquire the animated image thus generated by downloading using the user terminal 13 that transmitted the background images 230A, 230B, 230C, and 230D and the character image 231 that are the sources (Step S121). At this time, when cutoff animation images corresponding to the animated image are generated in the server device 10, the user can also download the cutoff animation images at the same time and print them out on, for example, a printer 300. Consequently, the user can enjoy the cutoff animation in which the background images 230A, 230B, 230C, and 230D and the character image 231 created by the user perform animation movements.

The generated animated image can further be delivered to the general public, for example, by a television broadcast station (TV station) 240 (Step S123).

It is not restricted thereto, and the animated image generated as described above can be delivered to an event site 250 or the like that is an environment in which specific people gather (Step S124). In the event site 250, a server device 251 is provided, and the animated image is reproduced on the server device 251 and is displayed on a display 252 such as a large-screen projector. In this case, when a user being present at the event site 250 has a corresponding handheld terminal, the user can acquire the animated image being reproduced by downloading (Step S125).

Furthermore, the server device 10 can output the background images 230A, 230B, 230C, and 230D and the character image 231 not combined but packaged as the combination data of these.

In this case, for example, in the TV station 240, the same functions as those of the movie generating unit 104 and the scenario generating unit 105 of the server device 10 are provided in the station, and the story and/or the like is generated, and the background images 230A, 230B, 230C, and 230D and the character image 231 are caused to perform respective animation movements and combined to generate the animated image in the TV station 240.

In the event site 250, the same functions as those of the movie generating unit 104 and the scenario generating unit 105 are provided on the server device 251, and as in the same manner, the server device 251 generates the story and/or the like, makes the background images 230A, 230B, 230C, and 230D and the character image 231 perform respective animation movements, and combines the foregoing to generate the animated image.

Second Service Example

Next, with reference to FIGS. 10 and 11, an example of a second service provided by the information processing system 1 according to the embodiment will be described. The second service example is an example in which the server device 10 processes character images transmitted from the user terminal 13 into a movie and outputs an animated image in which the animated character images are combined with a background image that is animated in advance. When the user views the animated image via the user terminal 13, the information accompanying the character image is then displayed near the character image.

In the following description, it is assumed that the user terminal 13 is provided with a camera on one side and a display on the other side, and is configured such that an image incident to the camera on the one side can be displayed on the display on the other side in near real time.

Figure 10:
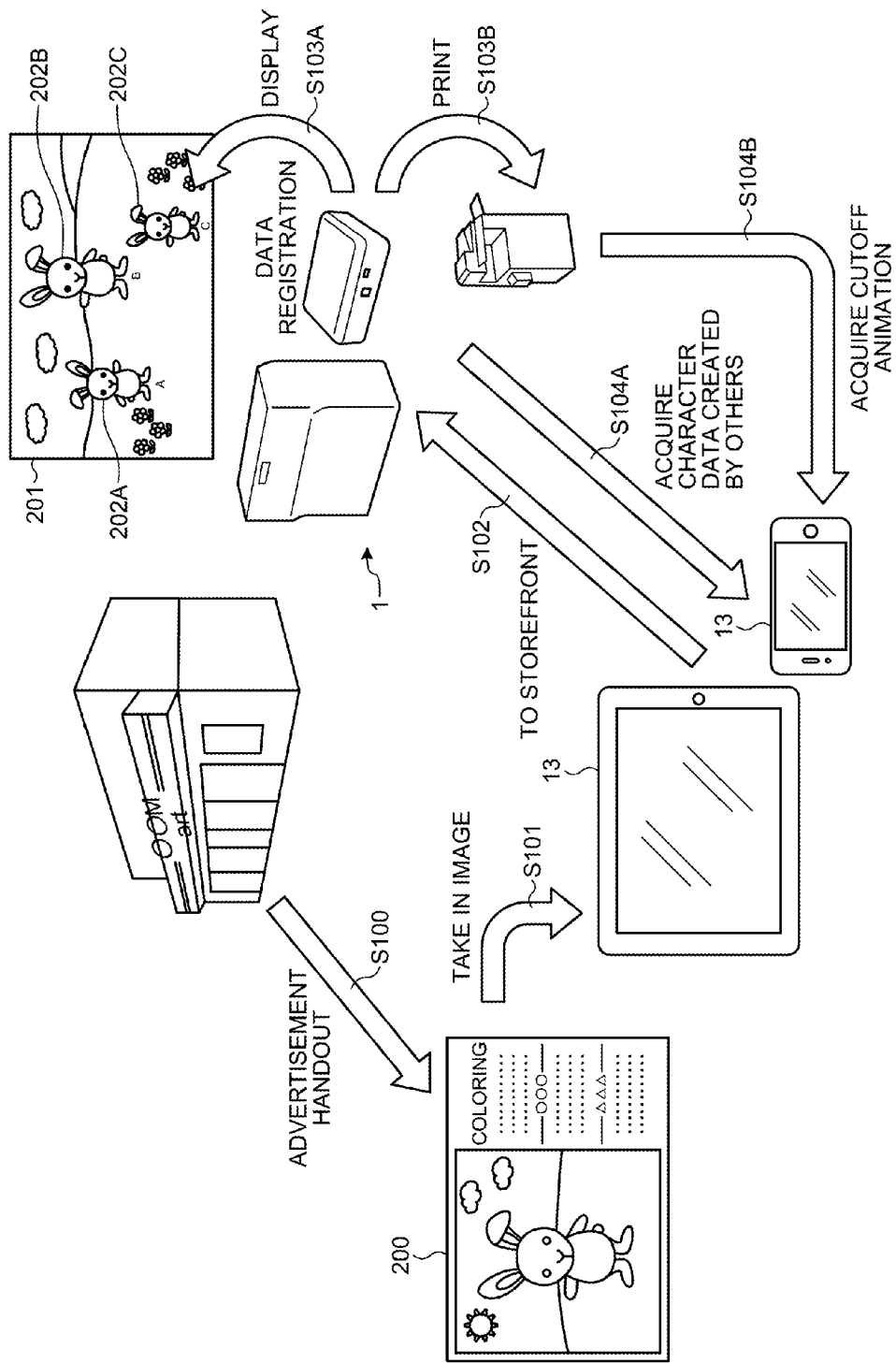
FIG. 10 is a diagram for explaining a second service example provided by the information processing system in the embodiment.
Figure 11:
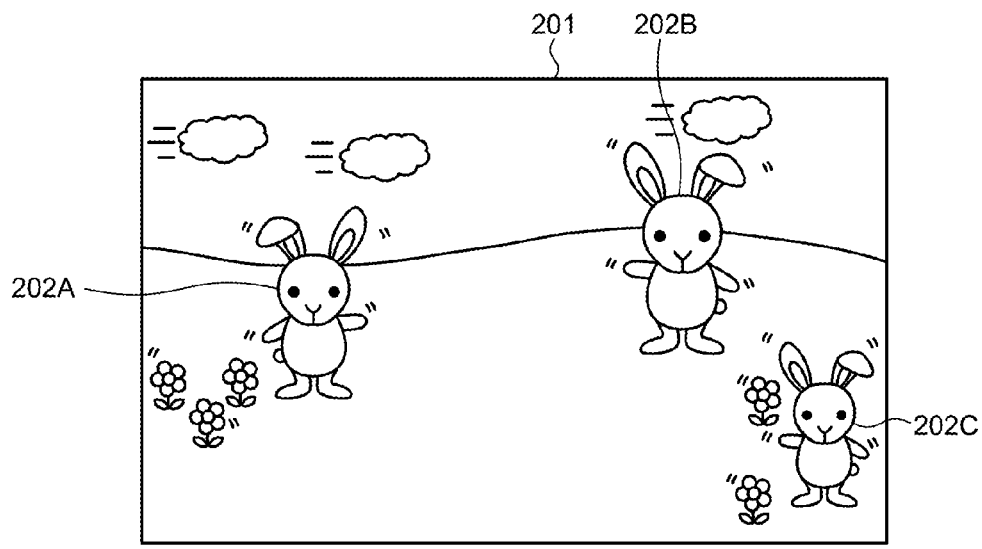
FIG. 11 is a diagram for explaining the second service example provided by the information processing system in the embodiment.

In FIG. 10, a main constituent that implements the second service, for example, a store distributes a coloring form 200 in a given format with advertisement handouts or the like (Step S100). The outlines of a character image is printed in the coloring form 200 in advance, and the user can obtain the character image of his/her favorite colors by performing the coloring according to the outlines of the character image. Further, a service ID and a field to fill out accompanying information of the character image, such as the name of creator, which is desirous to be displayed when the character image is combined with a background image later, are printed in the coloring form 200 in advance.

The user performs coloring on the coloring form 200 and further fills out the accompanying information, and then takes the image including the completed character image and the accompanying information into the user terminal 13, for example, by photographing (Step S101). At this time, the photograph is taken such that the service ID is included in the taken image. In the user terminal 13, the image processing unit 134 analyzes the taken image to extract the service ID. The image processing unit 134 may further analyze the image of the accompanying information and convert the image into character information. The accompanying information may be input using a character input function of the user terminal 13.

The user brings the user terminal 13 with him/her to the storefront of the store that supports the second service (Step S102). In the store, the signage device 12 (not depicted) that serves as a communication terminal of the information processing system 1 and supports near field communication is installed. Bringing the user terminal 13 close to the signage device 12 enables the user terminal 13 to perform communication with the information processing system 1 via the signage device 12. The user terminal 13, via this communication, transmits the character image, the accompanying information, the service ID, and the device ID of the user terminal 13 to the information processing system 1.

In the information processing system 1, the server device 10 specifies the workflow information 110 based on the service ID and the device ID received from the user terminal 13. In the workflow information 110 corresponding to the second service, for example, the parameter Input is set to the user terminal 13, and the parameter Output is set to the signage device 12 of a specific store and print output. Furthermore, the parameter Inputdata is set to character image and accompanying information, and the parameter Contents is set to a specific background image. The process parameter is set to display, image combination, movie generation, and cutoff animation.

The server device 10, in accordance with the specified workflow information 110, registers a transmitted character image 202A, for example, in the content storage unit 106 to be associated with the accompanying information, reads out a background image from the content storage unit 106, and generates a combined image 201 in which the character image 202A is combined with the background image (Step S103A). The combined image 201 is transmitted from the server device 10 to the signage device 12, and is then displayed on the display unit of the signage device 12.

The server device 10 can specify animation movements different from each other for the character image 202A and for the background image. The movement in animation can be defined in advance in the process parameter of the workflow information 110, for example. Whether to generate the animation may be configured to be specified, for example, as the process parameter in advance, or it can be configured to be specified from the user terminal 13. The combination of the animated background image and the animated character image 202A is performed by combining each image while synchronizing the frame timing therebetween as in the foregoing.

As the animation movement of the character image 202A, the movement such as movement around a specified route, deformation, expansion and shrinkage, and movement of a part can be conceived. As the animation movement for the background image, for example in the example in FIG. 10, the movement concerning the background such as movement of clouds and swaying of flowers can be conceived.

The server device 10 can further generate a cutoff animation based on the combined image 201 in which the animated character image 202A and the background image are combined. In this case, the data for each frame of the cutoff animation is transmitted from the server device 10 to a printer installed in the store, and the images of the respective frames are printed (Step S103B). The user takes home the sheets on which the images of the respective frames are printed (Step S140B), and thus the user can enjoy the cutoff animation of the character image 202A that the user created, at home.

The movement in cutoff animation can be defined in advance, for example, in the process parameter of the workflow information 110. Whether to generate the cutoff animation may be specified, for example, as the process parameter in advance, or it can be configured to be specified from the user terminal 13.

Furthermore, in this example, in the combined image 201, character images 202B and 202C created by other users are combined with the background image and displayed together with the character image 202A. The server device 10 can specify animation movement different from one another for each of the character images 202A, 202B, 202C, and so forth. The user photographs the character image 202B and the character image 202C created by the other users using the user terminal 13, and that enables the user to acquire, for example, the character image 202B included in the photographed image (Step S104A).

Now, photographing the combined image 201 using the user terminal 13 will be described. As one example, as illustrated in FIG. 11, it is assumed that the character images 202A, 202B, and 202C created by different users are displayed in the combined image 201. As illustrated in FIG. 11, the images of clouds are animated to move in a horizontal direction in the background image, and the images of flowers are animated to sway in the background image. Furthermore, the character images 202A, 202B, and 202C in the combined image 201 are animated to move differently from one another.

For the combined image 201, considered will be a situation of capturing an image of the character image 202A using the user terminal 13 that transmitted the image of, for example, the character image 202C. In this case, the user activates the camera function of the user terminal 13 and sets up the user terminal 13 such that the image capturing side thereof is aimed toward the combined image 201 and a display 136 is visible on the user side. On the display 136, the image captured by the image capturing unit 412 is displayed. The position of the user terminal 13 is then adjusted such that the character image 202A comes into the display 136.

Figure 12:
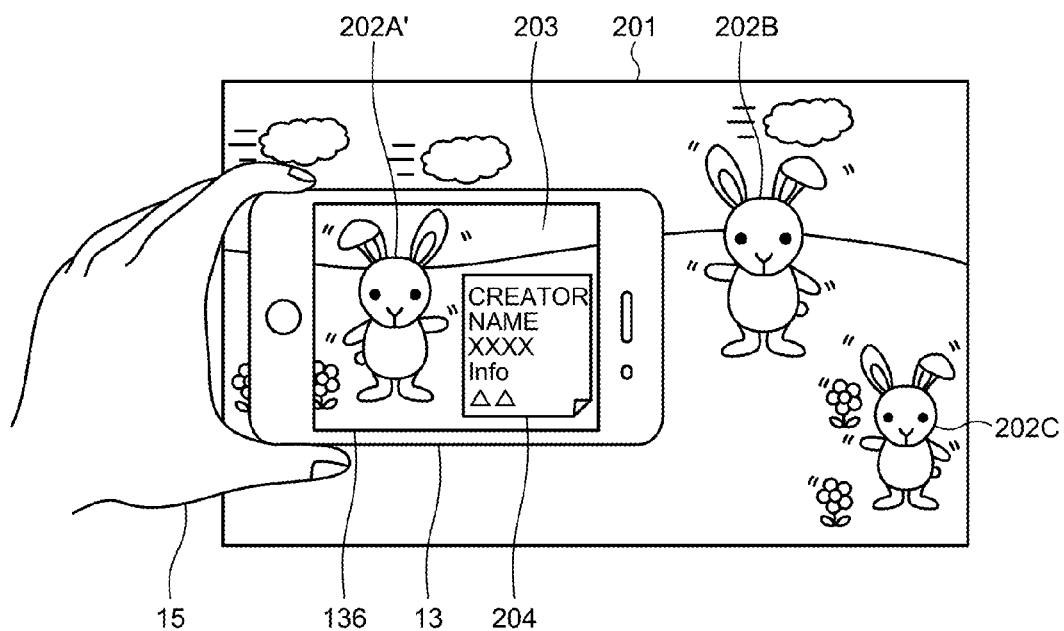
FIG. 12 is a diagram illustrating a situation of a character image being displayed on a display in the embodiment.

FIG. 12 illustrates a condition in which the character image 202A is displayed on the display 136 as a character image 202A'. On the display 136 of the user terminal 13 supported by a hand 15 of the user, an image 203 within a range of image-capturing is displayed and the character image 202A' is displayed in the image 203.

It is assumed here that, while the image of the combined image 201 is captured, the communication is performed between the user terminal 13 and the server device 10 at all times, for example, in accordance with a given operation performed on the user terminal 13. The user terminal 13 transmits the captured image to the server device 10 at all times or at a given time interval. At this time, the image may be not a color image and a process of converting to a binary image or a process of thinning pixels may be performed. It is preferable that the user terminal 13 transmit the image thus processed to lower the bit rate.

The server device 10 performs an image analysis on the transmitted image, and extracts the character image 202A'. The server device 10, for example, analyzes the image transmitted from the user terminal 13, and based on the background image and the respective character images 202A, 202B, and 202C in the animated image that the server device 10 itself transmits, determines which of the character images 202A, 202B, and 202C corresponds to the character image 202A' included in the image transmitted from the user terminal 13.

When the server device 10 determines that the character image 202A' and the character image 202A are in correspondence relation, the server device 10 reads out the accompanying information of the character image 202A from the content storage unit 106 and transmits it to the user terminal 13. The user terminal 13 converts the received accompanying information to an accompanying information image 204 that represents the accompanying information, and combines it with the image 203 to display on the display 136. At this time, the accompanying information of the character image 202A is combined to be placed at a position corresponding to the character image 202A, for example, near the character image 202A.

When the image capturing operation is performed on the user terminal 13 in the state in which the accompanying information image 204 is displayed, the image in which the accompanying information image 204 is added is taken in as a captured image. It is not restricted thereto, and an image in which the accompanying information image 204 is eliminated may be taken in as a captured image.

In the foregoing example, other images related to the character images 202A, 202B, and 202C can be added as a coloring image. Because all of the character images 202A, 202B, and 202C represent an animal in the above example, it is conceivable to use an image of food as the other images.

The user performs coloring on a coloring form in which the image of food is arranged in a coloring format in advance, and transmits the coloring image from the user terminal 13 to the server device 10. The server device 10 combines the coloring image with, for example, the image 203 to display. Furthermore, it can be configure that an animation movement in which the food of the image combined with the image 203 is given to any of the character images 202A, 202B, and 202C is performed by performing a given operation on the user terminal 13 and transmitting the operating information to the server device 10. At this time, by the server device 10 parameterizing the coloring image of food to quantify it, the server device 10 can further make, for example, the character image 202A to which the food of the image is given perform the animation movement corresponding to the numerical value.

Third Service Example

Next, with reference to FIG. 13, an example of a third service provided by the information processing system 1 in the embodiment will be described. The third service example is an example of one or more of character images created by the users performing the coloring thereon according to a given coloring format, as in a manner similar to that in the second service example, being moved toward one direction within a given display area.

At this time, in the third service example, a part of a single character image appears from one end of a display area in sequence, the image then moves toward the other end of the display area, and at the other end, the image disappears from a part thereof that reached the other end in sequence. Furthermore, in the third service example, the same display control is performed on two or more of the character images that are lined up in a row in one direction and displayable at the same time in the display area. Performing such display control can yield a display of different character images successively moving in the display area, achieving a show-window like effect.

Figure 13:
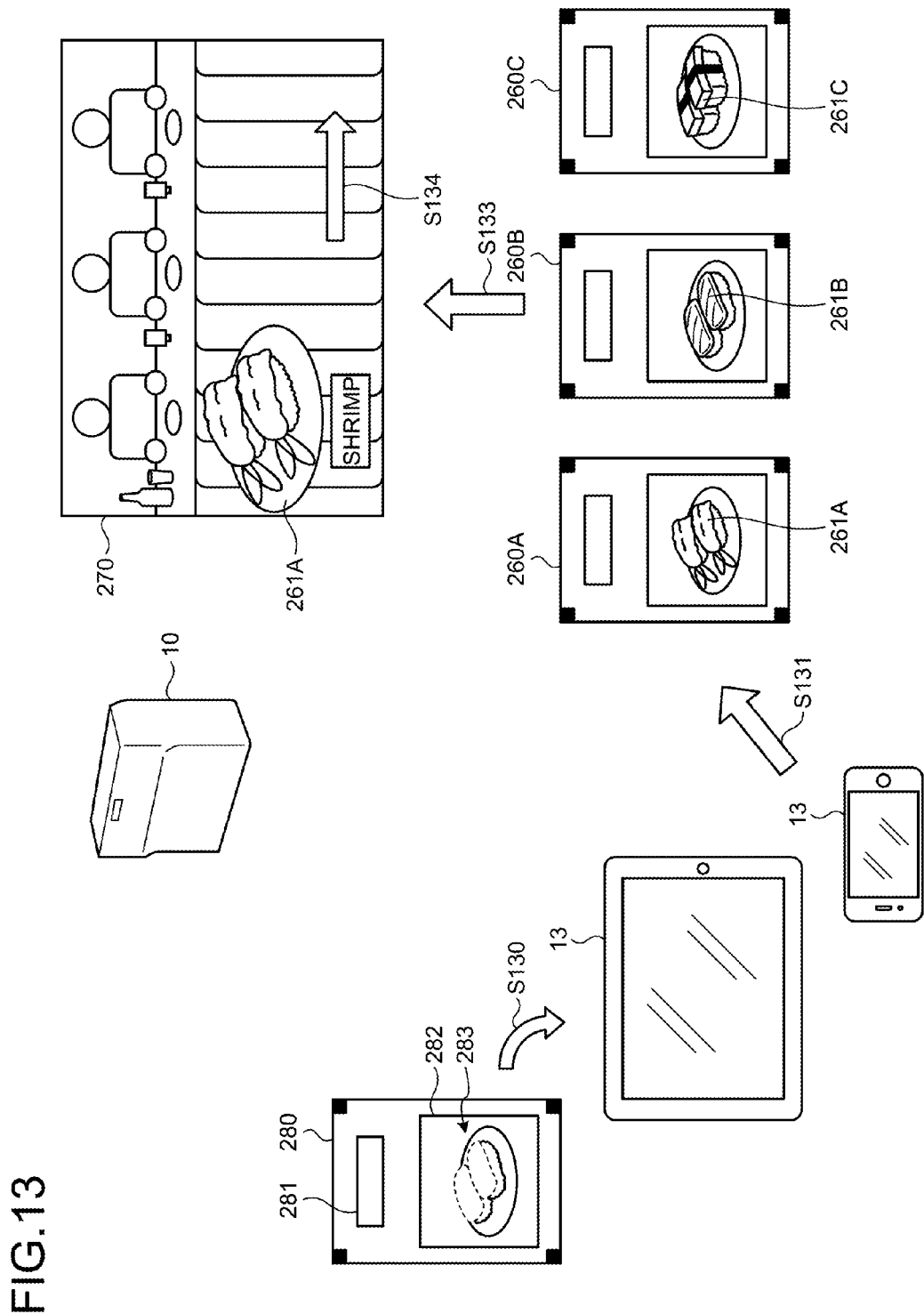
FIG. 13 is a diagram for explaining a third service example provided by the information processing system in the embodiment.

FIG. 13 is an example of the third service example being applied to a shop in which dishes carrying sushi are placed on a belt conveyor to rotate that is what is called a conveyor-belt sushi restaurant. For example, while a customer is waiting for a seat to be available, coloring forms 280 in a given format are prepared. On the coloring form 280, a dish and sushi rice are drawn and the portion for sushi items is made as a coloring portion, and in areas 281 and 282, frame borders are drawn. In the area 281, for example, a title of coloring is to be filled out, and in the area 282, the coloring portion is determined by the frame border. The coloring form 280 is further printed with a service ID in advance. The coloring form 280 is handed out to the waiting customer to have the coloring performed on the sushi item portion to his/her liking.

The coloring form 280 on which the coloring is performed is image-captured with the user terminal 13 of a known terminal ID (Step S130), and the captured image is transmitted to the server device 10 (Step S131). Examples of images of the image-captured coloring form 280, which are transmitted from the user terminal 13 as captured images, are illustrated as images 260A, 260B, and 260C. The images 260A, 260B, and 260C include character images 261A, 261B, and 261C, respectively, of sushi items with the coloring created to the user's likings within the frame border of the area 282.

The user terminal 13 of the known terminal ID may be the one provided in the shop, or may be the user terminal 13 the terminal ID of which is registered to the server device 10 in advance.

The server device 10 extracts the service ID from the image information of the coloring form 280, and from the extracted service ID and the terminal ID, specifies a workflow. Then, in accordance with the specified workflow, the server device 10 first extracts the character images 261A, 261B, and 261C from the coloring images of the images 260A, 260B, and 260C, respectively, based on the frame of the area 282. The server device 10 further extracts title information based on the frame of the area 281. While the title information extracted may be kept as an image, it may be converted to character information.

Furthermore, the server device 10 stores a background image 270 in the content storage unit 106 in advance. In the background image 270 in this example, the belt conveyor image portion at the lower is configured as a movie in which the animation movement of moving in one direction is designated, and the upper portion is configured as a fixed image.

The server device 10 specifies the animation movements for the character images 261A, 261B, and 261C (Step S133). The animation movements are the movements that synchronize with the animation movement of the belt conveyor in the background image 270. Each of the character images 261A, 261B, and 261C is animated within a virtual image area that is longer than the length of the background image 270 in the horizontal direction, and is looped in the horizontal direction. The virtual image area is clipped by the range of the background image 270. More specifically, the coloring image 261A displayed at a position within the background image 270 is moved with time, and disappears, for example, from the right edge of the background image 270 in sequence. Then, after the lapse of a given time nearly corresponding to a time taken to go round the loop, the character image 261A appears in sequence from the edge of the background image 270 on the side opposite to the side at which it disappeared, i.e., the left edge. The appearance and disappearance of the respective character images 261A, 261B, and 261C are performed in sequence, and thus within the background image 270, the character images 261A, 261B, and 261C of a given number or less are to be displayed.

Performing such control on the character images 261A, 261B, and 261C can achieve the display in which the character images 261A, 261B, and 261C are sequentially scrolled on the background image 270 (Step S134).

Furthermore, in the example in FIG. 13, the title information is arranged below the character image 261A.

The server device 10 combines the background image 270 with the character images 261A, 261B, and 261C to display them on the display device in this way. Consequently, the elimination of waiting time of the customer can be expected.

Other Embodiments

While the character image that the user created has been exemplified to be combined with the background image and others as an animated image in the foregoing, it is not restricted to these examples. For example, the character image can be made stereoscopic using a 3D printer that forms a solid object by stacking layers of cross section structures. In this case, when the server device 10 is caused to hold the coloring format of a character image, the server device 10 is further caused to hold the 3D data of the character image made stereoscopic at the same time. Applying the coloring performed on the character image to the 3D data can make the character image stereoscopic.

Furthermore, when a character image is, for example, in a human form or the like, it is conceivable to create a movie in which portions corresponding to hands and feet are deformed. For example, in the server device 10, it is conceivable to prepare animations of deforming hands and feet in advance. Application of coloring to the deformed portion can be made by the process of expanding or shrinking the image. In this case, when the movie can be controlled by the operation performed on the user terminal 13, a movie in which the character image is like fighting can be achieved. Moreover, when two character images are displayed on a single background image at the same time, making the character images operable from the user terminals 13 that transmitted the respective character images enables the two character images to play a match.

It is further conceivable that, for example, a character image can be processed as an icon for use in a social networking service (SNS). In this case, it is conceivable that, when communicating between users in SNS, the character image processed to an animated image is applied as an icon used to express emotions of delight, anger, sorrow, pleasure, and such.

The embodiment has an advantageous effect of making a plurality of services provided via a network available easily.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing system comprising:
   a terminal device including,
      first storage storing computer-readable first instructions, and
      one or more first processors configured to execute the first instructions; and
   at least one information processing apparatus including,
      second storage storing computer-readable second instructions,
      one or more second processors configured to execute the second instructions, and
      at least one memory,
   the one or more first processors being configured to execute the first instructions such that the one or more first processors are configured to,
      acquire first information from a display medium displayed to a user,
      acquire a first image and accompanying information accompanying the first image, the first image and accompanying information being input by the user, and
      transmit the acquired first information, the acquired first image and the acquired accompanying information to the at least one information processing apparatus,
   the one or more second processors being configured to execute the second instructions such that the one or more second processors are configured to,
      receive the first information, the first image and the accompanying information transmitted from the terminal device,
      generate display data including a display object based on the transmitted first image,
      determine an output device based on the transmitted first information, and
      output the generated display data to the determined output device for displaying the generated display data to the user,
   the one or more first processors being configured to execute the first instructions such that the one or more first processors are further configured to,
      display a screen for photographing,
      transmit, to the at least one information processing apparatus, a second image obtained by photographing via the screen,
      receive the accompanying information in response to transmitting the second image, and
      display the received accompanying information on the screen, and
   the one or more second processors are configured to execute the second instructions such that the one or more second processors are further configured to,
      receive the second image transmitted from the terminal device, and
      transmit the accompanying information accompanying the first image to the terminal device when the received second image includes the display object based on the first image.

2. The information processing system according to claim 1,
   wherein the one or more first processors are configured to execute the first instructions such that the one or more first processors are further configured to acquire at least one of a background image for which a whole area of the image is a target of handling and a character image for which a part of the image is a target of handling, and
   wherein the one or more second processors are configured to execute the second instructions such that the one or more second processors are further configured to generate the display data by processing the background image and the character image independently of each other in a service.

3. The information processing system according to claim 2, wherein the one or more second processors are configured to execute the second instructions such that the one or more second processors are further configured to generate the display data by combining a first movie and a second movie, the first movie being generated by processing the background image into a movie that is switched in sequence along a set time axis, the second movie being generated by processing the character image into a movie different from the movie of the background image in movement.

4. The information processing system according to claim 2, wherein,
   the at least one memory stores one or more contents for provision to the user,
   the one or more first processors are configured to execute the first instructions such that the one or more first processors are further configured to,
      transmit the acquired first information, the acquired accompanying information and terminal identification information that identifies the terminal device, the acquired first image being the character image, and the one or more second processors are configured to execute the second instructions such that the one or more second processors are further configured to,
receive the first information, the character image, the accompanying information and the terminal identification information transmitted from the terminal device,
manage the transmitted character image associated with the transmitted terminal identification information and the transmitted accompanying information, and
generate the display data including one or more display objects each based on one or more managed character images respectively and a content of the background image, the content of the background image being stored in the at least one memory.

5. The information processing system according to claim 4, wherein the one or more second processors are configured to execute the second instructions such that the one or more second processors are further configured to output the display data combining each display object of the character images received from the terminal device with the background image such that the character images are sequentially automatically scrolled and a number of displayed character images is a first number or less.

6. The information processing system according to claim 1, wherein the one or more second processors are configured to execute the second instructions such that the one or more second processors are further configured to output the display data to a signage device.

7. The information processing system according to claim 1, wherein one or more second processors are configured to execute the second instructions such that the one or more second processors are further configured to provide a television (TV) station with the display data.

8. The information processing system according to claim 1, wherein the at least one memory stores a plurality of pieces of workflow information defining processes to be executed,
the processes of each of the plurality of pieces of the workflow information including a process of generating the display data and a process of outputting the display data to the output device,
each piece from among the plurality of pieces of workflow information corresponding to the first information,
the one or more second processors being configured to execute the second instructions such that the one or more second processors are further configured to,
generate the display data based on the workflow information corresponding to the transmitted first information,
determine the output device based on the workflow information corresponding to the transmitted first information, and
output the display image to the output device based on the workflow information corresponding to the transmitted first information.

9. The information processing system according to claim 1,
wherein the one or more first processors are configured to execute the first instructions such that the one or more first processors are further configured to display the received accompanying information on the screen when the display object associated with the received accompanying information is displayed on the screen, the displayed accompanying information including a name related to the display object.

10. An information processing method comprising:
acquiring, by one or more first processors of a terminal device, first information from a display medium displayed to a user;
acquiring, by the one or more first processors, a first image and accompanying information accompanying the first image, the first image and accompanying information being input by the user;
transmitting, by the one or more first processors, the acquired first information, the acquired first image and the acquired accompanying information to at least one information processing apparatus;
receiving, by one or more second processors of the at least one information processing apparatus, the first information, the first image and the accompanying information transmitted from the terminal device;
generating, by the one or more second processors, display data including a display object based on the transmitted first image;
determining, by the one or more second processors, an output device based on the transmitted first information;
outputting, by the one or more second processors, the generated display data to the determined output device for displaying the generated display data to the user;
displaying, by the one or more first processors, a screen for photographing;
transmitting, by the one or more first processors, to the at least one information processing apparatus, a second image obtained by photographing via the screen;
receiving, by the one or more first processors, the accompanying information in response to transmitting the second image;
displaying, by the one or more first processors, the received accompanying information on the screen;
receiving, by the one or more second processors, the second image transmitted from the terminal device; and
transmitting, by the one or more second processors, the accompanying information accompanying the first image to the terminal device when the received second image includes the display object based on the first image.

11. The information processing method according to claim 10, further comprising:
acquiring, by the one or more first processors, at least one of a background image for which a whole area of the image is a target of handling and a character image for which a part of the image is a target of handling, and
generating, by the one or more second processors, the display data by processing the background image and the character image independently of each other in a service.

12. The information processing method according to claim 11, further comprising:
generating, by the one or more second processors, the display data by combining a first movie and a second movie, such that the first movie is generated by processing the background image into a movie that is switched in sequence along a set time axis and the second movie is generated by processing the character image into a movie different from the movie of the background image in movement.

13. The information processing method according to claim 11, wherein,
at least one memory of the at least one information processing apparatus stores one or more contents for provision to the user, and the information processing method further comprises:
  transmitting, by the one or more first processors, the acquired first information, the acquired accompanying information and terminal identification information that identifies the terminal device, the acquired first image being the character image;
  receiving, by the one or more second processors, the first information, the character image, the accompanying information and the terminal identification information transmitted from the terminal device;
  managing, by the one or more second processors, the transmitted character image associated with the transmitted terminal identification information and the transmitted accompanying information, and
  generating, by the one or more second processors, the display data including one or more display objects each based on one or more managed character images respectively and a content of the background image, the content of the background image being stored in the at least one memory.

14. The information processing method according to claim 13, further comprising:
  outputting, by the one or more second processors, the display data combining each display object of the character images received from the terminal device with the background image such that the character images are sequentially automatically scrolled and a number of displayed character images is a first number or less.

15. The information processing method according to claim 10, further comprising:
  outputting, by the one or more second processors, the display data to a signage device.

16. The information processing method according to claim 10, further comprising:
  providing, by the one or more second processors, a television (TV) station with the display data.

17. The information processing method according to claim 10, wherein at least one memory of the at least one information processing apparatus stores a plurality of pieces of workflow information defining processes to be executed,
  the processes of each of the plurality of pieces of the workflow information including a process of generating the display data and a process of outputting the display data to the output device,
  each piece from among the plurality of pieces of workflow information corresponding to the first information,
  the method further comprising:
    generating, by the one or more second processors, the display data based on the workflow information corresponding to the transmitted first information,
    determining, by the one or more second processors, the output device based on the workflow information corresponding to the transmitted first information, and
    outputting, by the one or more second processors, the display image to the output device based on the workflow information corresponding to the transmitted first information.

18. The information processing method according to claim 10, further comprising:
  displaying, by the one or more first processors, the received accompanying information on the screen when the display object associated with the received accompanying information is displayed on the screen, the displayed accompanying information including a name related to the display object.

* * * * *